3,787,414
DIHYDROPYRIMIDOPYRIDAZINE DERIVATIVES
Shojiro Yurugi, Kyoto, and Shintaro Kikuchi, Hyogo, Japan, assignors to Takeda Chemical Industries, Ltd., Osaka, Japan
No Drawing. Filed Oct. 4, 1971, Ser. No. 186,447
Claims priority, application Japan, Oct. 14, 1970, 45/90,713
Int. Cl. C07d 87/40
U.S. Cl. 260—246 B                14 Claims

ABSTRACT OF THE DISCLOSURE

Compounds of the formula

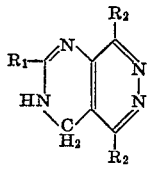

wherein $R_1$ is an aromatic hydrocarbon or heterocyclic group, such as phenyl or thienyl, and $R_2$ is a secondary or tertiary amine group, such as piperidino, cyclohexylamino, anilino or isopropylamino, have effective diuretic activity.

---

The present invention relates to novel dihydropyrimidopyridazine derivatives and their pharmaceutically acceptable salts, which have effective diuretic action.

The present invention also relates to a process for the production of these dihvdropyrimidopyridazine derivatives.

There have been synthesized many kinds of diuretics, and some of them have been applied to practical use, typical examples of which are chlorothiazide derivatives, acetazolamide, triameterene, trifrocine, furosemide, etc.

However, known diuretics are not very satisfactory in view of one or more of such drawbacks as promoting the excretion of potassium as well as sodium, causing side effects (e.g. increase of blood glucose level and blood uric acid level) upon long-term administration, and showing rather low diuretic activity and rather high toxicity.

Under these circumstances, the present inventors have made extensive studies for providing effective diuretics accompanied with no such drawback as above.

As the result of their studies, the present inventors have succeeded in synthesizing novel dihydropyrimido[4,5-d] pyridazine derivatives, and found out that these compounds can answer the purpose.

The present inventors also found out that the acid addition salts of these compounds have high solubility in water and the aqueous solutions of these acid addition salts are very stable for a relatively long period of time. Therefore, these compounds are of great advantage to use in the form of injectable solutions.

The present invention has been accomplished on the basis of those findings.

Thus, the principal object of the present invention is to provide novel dihydropyrimido[4,5-d]pyridazine derivatives useful as effective and improved diuretics. Another object is to provide a method for the production of these novel compounds.

The dihydropyrimido[4,5-d]pyridazine derivatives of the present invention are those represented by the following general formula

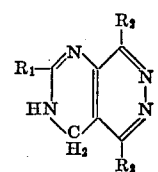

wherein $R_1$ stands for an aromatic hydrocarbon or heterocyclic group, which is unsubstituted or substituted, $R_2$ stands for a secondary amino group or a tertiary amino group, or their 1,4-dihydro isomers and their pharmaceutically acceptable salts.

In the General Formula I, the aromatic hydrocarbon residue represented by symbol $R_1$ includes that having up to 10 carbon atoms such as phenyl, naphthyl.

The heterocyclic group represented by symbol $R_1$ includes 5 to 6-membered monocyclic ones containing one hetero atom of N, S and O. Typical examples of the groups are, for example, furyl, thienyl or pyridyl. The substituents of the above-mentioned aromatic hydrocarbon residue or heterocyclic group may, for instance, be a lower alkyl (e.g. methyl, ethyl, propyl, isopropyl), halogen (i.e. chlorine, bromine, fluorine, iodine) and a heterocyclic group such as 5 or 6 membered heterocyclic group containing one or two hetero atoms of N, S and O (e.g. morpholino, piperazino, pyrrolidino).

The secondary or tertiary amino group represented by symbol $R_2$ includes a cyclic amino group, a mono- or dialkylamino group, a monocycloalkylamino group, monoarylamino group and a monoaralkylamino group, the alkyl or cycloalkyl being preferably a lower one having up to 6 carbon atoms (e.g. methyl, ethyl, propyl, isopropyl, butyl, t-butyl, amyl, hexyl, cyclohexyl, cyclopentyl, etc.) and the aryl or aralkyl being preferably that having up to 10 carbon atoms (e.g. phenyl, naphthyl, benzyl, phenylethyl, etc.).

These secondary or tertiary amino groups may contain one or more substituents such as lower alkyls (e.g. methyl, ethyl), aralkyl (e.g. benzyl), hydroxy and lower alkoxy (e.g. methoxy, ethoxy).

The cyclic amino group includes, for instances, pyrrolidino, piperidino, morpholino, piperazino, N-methylpiperazino, N-benzylpiperazino.

The mono- or dialkylamino group includes, for instance, methylamino, ethylamino, propylamino, isopropylamino, butylamino, dimethylamino, diethylamino, methylethylamino, 2-ethoxyethylamino, 2-methoxyethylamino, N-methyl-2-hydroxyethylamino. The monocycloalkylamino group includes, for example, cyclohexylamino. The monoarylamino includes, for example, anilino, naphthylamino. The aralkyl amino group includes, for example, benzylamino, N-benzyl-2-hydroxyethylamino.

The pharmaceutically acceptable salts of the present compounds include addition salts with an inorganic acid such as hydrochloric acid, sulfuric acid, nitric acid, phosphoric acid, etc. and with an organic acid such as oxalic acid, maleic acid, malic acid, tartaric acid, methanesulfonic acid, ethanesulfonic acid, etc.

Typical compounds represented by the General Formula I are exemplified below:

(1) 2-phenyl-3,4-dihydro-5,8-dimorpholinopyrimido[4,5-d]pyridazine
(2) 2-phenyl-3,4-dihydro-5,8-dipyrrolidinopyrimido[4,5-d]pyridazine
(3) 2-phenyl-3,4-dihydro-5,8 - dipiperidinopyrimido[4,5-d]pyridazine
(4) 2-phenyl-3,4-dihydro-5,8 - bis(N - benzylpiperazino)-pyrimido[4,5-d]pyridazine
(5) 2-phenyl-3,4-dihydro-5,8 - bis(ethylamino)pyrimido[4,5-d]pyridazine
(6) 2-phenyl-3,4-dihydro-5,8-bis(benzylamino)pyrimido[4,5-d]pyridazine
(7) 2-phenyl-3,4-dihydro - 5,8 - bis(isopropylamino)pyrimido[4,5-d]pyridazine
(8) 2-phenyl-3,4-dihydro-5,8 - bis(n - propylamino)pyrimido[4,5-d]pyridazine
(9) 2 - phenyl - 3,4-dihydro-5,8-bis(N-methyl-2-hydroxyethylamino)pyrimido[4,5-d]pyridazine
(10) 2-phenyl-3,4-dihydro-5,8-bis(N-benzyl-2 - hydroxyethylamino)pyrimido[4,5-d]pyridazine
(11) 2-(4-chlorophenyl)-3,4 - dihydro-5,8-dimorpholinopyrimido[4,5-d]pyridazine
(12) 2 - (4 - chlorophenyl)-3,4-dihydro-5,8-dipiperidinopyrimido[4,5-d]pyridazine
(13) 2-(3-tolyl)-3,4-dihydro-5,8 - dimorpholinopyrimido[4,5-d]pyridazine
(14) 2-(3-tolyl)-3,4-dihydro - 5,8 - bis(isopropylamino)-pyrimido[4,5-d]pyridazine
(15) 2-(3-tolyl) - 3,4-dihydro-5,8-dipiperazinopyrimido[4,5-d]pyridazine
(16) 2 - (4 - chlorophenyl) - 3,4-dihydro-5,8-bis(benzylamino)pyrimido[4,5-d]pyridazine
(17) 2-(4-chlorophenyl)-3,4-dihydro - 5,8 - dianilinopyrimido[4,5-d]pyridazine
(18) 2-(β-naphthyl)-3,4-dihydro - 5,8 - dimorpholinopyrimido[4,5-d]pyridazine
(19) 2-(β - naphthyl) - 3,4-dihydro-5,8-dipiperidinopyrimido[4,5-d]pyridazine
(20) 2-(β-naphthyl)-3,4-dihydro-5,8-bis(isopropylamino)-pyrimido[4,5-d]pyridazine
(21) 2-(2-furyl)-3,4-dihydro-5,8 - dimorpholinopyrimido[4,5-d]pyridazine
(22) 2 - (2-thienyl)-3,4-dihydro-5,8 - dimorpholinopyrimido[4,5-d]pyridazine
(23) 2 - (2 - pyridyl)-2,4-dihydro-5,8-dimorpholinopyrimido[4,5-d]pyridazine
(24) 2-phenyl-3,4-dihydro-5,8-bis(N-methyl-2-hydroxyethylamino)pyrimido[4,5-d]pyridazine
(25) 2-phenyl-3,4-dihydro-5,8-bis(phenylamino)pyrimido[4,5-d]pyridazine
(26) 2-phenyl-3,4-dihydro-5,8-bis(3,5-dimethylmorpholino)pyrimido[4,5-d]pyridazine
(27) 2-phenyl-3,4-dihydro-5,8-bis(cyclohexylamino)pyrimido[4,5-d]pyridazine
(28) 2-phenyl-3,4-dihydro-5,8-bis(3-methylmorpholino)pyrimido[4,5-d]pyridazine
(29) 2-(4-chlorophenyl)-3,4-dihydro-5,8-bis(phenylamino)pyrimido[4,5-d]pyridazine
(30) 2-(4-chlorophenyl)-3,4-dihydro-5,8-bis(3,5-dimorpholino)pyrimido[4,5-d]pyridazine
(31) 2-(4-chlorophenyl)-3,4-dihydro-5,8-bis(cyclohexylamino)pyrimido[4,5-d]pyridazine
(32) 2-(4-chlorophenyl)-3,4-dihydro-5,8-bis(3-methylmorpholino)pyrimido[4,5-d]pyridazine
(33) 2-(4-chlorophenyl)-3,4-dihydro-5,8-bis(isopropylamino)pyrimido[4,5-d]pyridazine
(34) 2-(2-furyl)-3,4-dihydro-5,8-bis(isopropylamino)pyrimido[4,5-d]pyridazine
(35) 2-(2-furyl)-3,4-dihydro-5,8-bis(benzylamino)pyrimido[4,5-d]pyridazine
(36) 2-(2-furyl)-3,4-dihydro-5,8-bis(cyclohexylamino)pyrimido[4,5-d]pyridazine
(37) 2-(2-furyl)-3,4-dihydro-5,8-dipiperidinopyrimido[4,5-d]pyridazine
(38) 2-(2-furyl)-3,4-dihydro-5,8-dipyrrolidinopyrimido[4,5-d]pyridazine
(39) 2-(2-thienyl)-3,4-dihydro-5,8-bis(isopropylamino)pyrimido[4,5-d]pyridazine
(40) 2-(2-thienyl)-3,4-dihydro-5,8-bis(benzylamino)pyrimido[4,5-d]pyridazine
(41) 2-(2-thienyl)-3,4-dihydro-5,8-bis(cyclohexylamino)pyrimido[4,5-d]pyridazine
(42) 2-(2-thienyl)-3,4-dihydro-5,8-dipiperazinopyrimido[4,5-d]pyridazine
(43) 2-(2-thienyl)-3,4-dihydro-5,8-dipyrrolidinopyrimido[4,5-d]pyridazine
(44) 2-(2-pyridyl)-3,4-dihydro-5,8-dipiperidinopyrimido[4,5-d]pyridazine
(45) 2-(2-pyridyl)-3,4-dihydro-5,8-dipyrrolidinopyrimido[4,5-d]pyridazine
(46) 2-(2-pyridyl)-3,4-dihydro-5,8-bis(benzylamino)pyrimido[4,5-d]pyridazine
(47) 2-(2-pyridyl)-3,4-dihydro-5,8-bis(isopropylamino)pyrimido[4,5-d]pyridazine
(48) 2-phenyl-3,4-dihydro-5,8-bis(cyclohexylamino)pyrimido[4,5-d]pyridazine, and their 1,4-dihydro isomers.

The present compounds of the General Formula I are produced by reducing a compound of the General Formula II

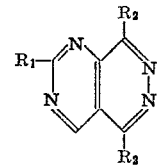

[II]

wherein $R_1$ and $R_2$ have the same meaning as above.

The reduction of the present invention can be conducted after any of per se conventional means which have been generally used for reduction of a double bond of —CH=N— to a single bond of —CH$_2$—NH—.

The methods of the reduction may be exemplified by (I) a method which comprises using a reducing agent, for example, a combination of a metal (e.g. zinc, sodium, magnesium, aluminum, amalgam thereof, lithium, tin, iron) and an acid (e.g. hydrochloric acid, sulfuric acid, acetic acid), an alcohol (e.g. ethyl alcohol, methyl alcohol), alkaline substance (e.g. sodium hydroxide, liquid ammonia) or water; a low valency metal compound (e.g. stannous chloride, ferrous sulfate, ferrous hydroxide); a compound which acts as an oxygen-acceptor (e.g. sulfide such as sodium sulfide, ammonium sulfide, hydrogen sulfide; dithionite such as sodium dithionite; sulfite such as sodium sulfite); a complex metal hydride (e.g. lithium aluminum hydride, lithium borohydride), (II) a catalytic reduction which comprises using hydrogen gas and a catalyst such as noble metal catalyst (e.g. platinum oxide, palladium - carbon), Raney nickel, copper - chromium oxide, or (III) an electrolytic reduction. Among these methods, the method (I) or (II) is rather conveniently applicable.

The hydrogen gas may be employed at atmospheric pressure or at an elevated pressure.

In carrying out this catalytic reduction, temperature, pressure, time and solvent vary with the kind of starting material to be reduced and a catalyst used, and these reaction conditions are not necessarily critical. Practically, it is preferred to carry out this catalytic reduction by using a noble metal catalyst such as platinum oxide in a solvent such as an organic carboxylic acid (e.g. formic acid, acetic acid) at room temperature and atmospheric pressure.

In carrying out the present reduction by using a reducing agent mentioned above, reaction conditions such as temperature, solvent or time vary with the kind of starting material to be reduced and the reducing agent used, and they are not necessarily critical. Practically, it is preferred to carry out this reduction by using a reducing agent such as lithium aluminum hydride, lithium borohydride or metalic sodium in the presence of a suitable organic solvent such as ethers (e.g. ethyl ether, tetrahydrofuran), alcohols (e.g. methyl alcohol, ethyl alcohol) under cooling or at a temperature ranging from room temperature to the reflux temperature of the reaction system for about 1 to about 24 hours.

Incidentally, the starting compounds represented by the General Formula II may be produced by the steps shown in the following scheme:

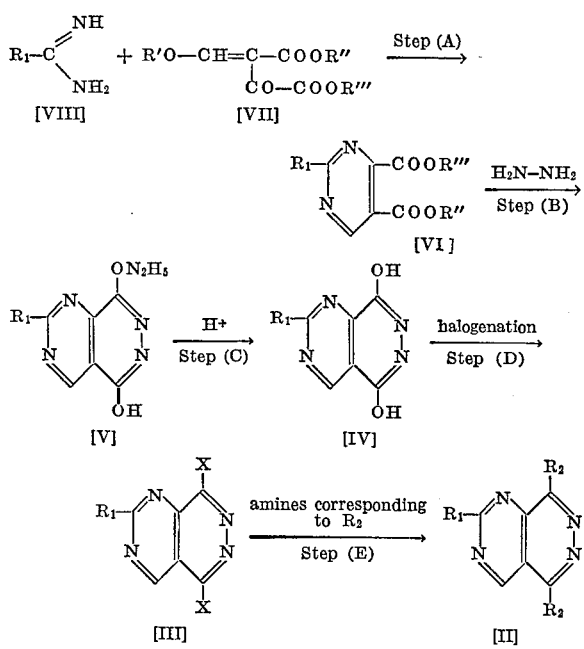

wherein $R_1$ and $R_2$ have the same meaning as above; X stands for a halogen atom; R′, R″ and R‴ are the same or different and each stands for a lower alkyl group.

The following is more detailed explanation of the above respective steps.

The reaction of step (A) is carried out preferably in a suitable solvent (e.g. methyl alcohol, ethyl alcohol, chloroform, tetrahydrofuran, ethyl acetate) and in the presence of an alkali metal alcoholate (e.g. methylate, ethylate of sodium, potassium, lithium) as a condensation agent at room temperature or under cooling.

The reaction of step (B) is carried out preferably in a suitable solvent (e.g. methyl alcohol, ethyl alcohol, tetrahydrofuran, dioxane) around the boiling point of the solvent used.

An amount of hydrazine to be used in the reaction of step (B) is preferably about 2 moles or more per mole of the Compound VI.

The reaction of step (C) is generally conducted by treating a compound of the General Formula V with an acid at room temperature or under cooling.

As the above-mentioned acid, any of acids which can convert the hydrazinium salt of the General Formula V to the corresponding hydroxy derivative of the General Formula IV may be used.

Typical examples of the acids usable are hydrochloric acid, sulfuric acid, acetic acid. The reaction of the step (D) is generally conducted by subjecting a compound of the General Formula IV to halogenation in a suitable solvent (e.g. pyridine, dimethylsulfoxide, N,N-dimethylformamide, benzene) by heating under reflux a mixture of the compound of the General Formula IV and a halogenating agent (e.g. phosphorus oxychloride, phosphorus pentachloride, phosphorus tribromide, phosphorus trichloride).

The reaction of step (E) is carried out by reacting a compound of the General Formula III with an amine corresponding to $R_2$ of the General Formula II.

The reaction is preferably conducted in a suitable solvent (e.g. acetone, methyl alcohol, ethyl alcohol, tetrahydrofuran, chloroform, ethylacetate, benzene) or by using a large excess of the above-mentioned amine around the boiling point of the solvent or an amine used.

After completion of the reaction of this invention, the subject compound of the General Formula I may be isolated and purified by a conventional method, e.g. extraction with a suitable solvent, followed by evaporation, recrystallization or a treatment with column-chromatography, etc.

When the subject compound is obtained as a free base, it may be converted to its acid salt with an acid such as organic ones (e.g. oxalic acid, malic acid, maleic acid, tartaric acid, etc.) and inorganic ones (e.g. hydrochloric acid, sulfuric acid, nitric acid, phosphoric acid, etc.).

The subject compounds of the General Formula I have effective diuretic action.

Namely, the present compounds are characterized by the following properties.

(1) The subject compounds of this invention have effective and strong diuretic action.

(2) The present compounds show extremely low toxicity.

(3) The present compounds induce urinary excretion of a large amount of sodium ion, but induce urinary excretion of relatively small amount of potassium ion which is an essential element to human body.

Thus, the excretion ratio of urinary $Na^+/K^+$ is comparatively high in the present compounds.

(4) The present compounds can produce a marked additional diuretic response in the animal undergoing maximum diuresis with known diuretics. This fact suggests that the mechanism of diuretic action of the present compounds is different from those of known diuretics. Thus, combination of the present compounds with other known diuretics can produce much increased diuretic effect.

(5) Even when the present compounds are administered continuously for a long time, substantially no side effect (e.g. increase of blood glucose levels and blood uric acid levels) is observed.

(6) The aqueous solutions of acid salts of the present compounds are very stable for a relatively long period of time. Therefore the present compounds are of great advantage to use in the form of injectable solution.

Taking advantage of the above characteristic properties, the subject compounds of the present invention can be used as diuretics and are administered for the purpose in per se or in the form of a pharmaceutically acceptable composition in admixture with a suitable and conventional carrier or adjuvant.

The pharmaceutical composition may take the form of tablets, granules, powders, capsules, injections and may be administered orally or parenterally.

Usual daily doses of the compounds lie in the range of about 10 to about 200 milligrams per human adult upon oral administration or about 1 to about 20 milligrams per human adult upon injectional administration (e.g., intravenously).

The subject compounds of the present invention are 3,4-dihydro derivatives, but they can form also 1,4-dihydro isomers. There is observed an equilibrium state between the 3,4-dihydro derivatives and the 1,4-dihydro derivatives in a state of solution;

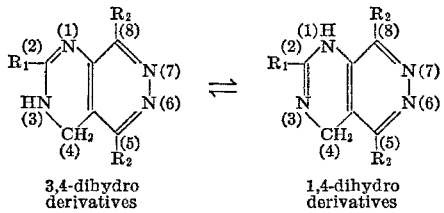

3,4-dihydro derivatives    1,4-dihydro derivatives

The equilibrium state shifts to left when the system is acidic condition, while shifts to right when alkaline condition. The 1,4-dihydro derivatives can be isolated by keeping a solution of the compounds in water at alkaline condition. However, when the solution contains an organic solvent, the 1,4-dihydro derivatives can hardly be isolated, but is obtained as 3,4-dihydro derivatives.

More particularly, when the reaction mixture of the reduction process of this invention is subjected to a separation step, there is isolated 3,4-dihydro derivatives, since the reduction is usually conducted in the presence of an organic solvent. If thus obtained 3,4-dihydro derivatives are in the form of water-soluble salts (e.g. hydrochloride) or free bases of thus obtained 3,4-dihydro derivatives are converted into the water-soluble salts, these water soluble salts can give a solution of these derivatives in water, and by adjusting this solution to alkaline condition, for example by the addition of an alkali hydroxide, the 1,4-dihydro derivatives are isolated.

The 1,4-dihydro derivatives show substantially the same pharmacological effects as those of the 3,4-dihydro derivatives, and therefore the 1,4-dihydro derivatives can be used as diuretics in the same field and in the same manner as those of the 3,4-dihydro derivatives.

For further explanation of the present invention, following examples are given wherein the word "part(s)" is based on weight unless otherwise noted, and relation between "part" and "volume part" corresponds to that between gram and milliliter.

REFERENCE

A mixture of 2.0 parts of 2-phenyl-5,8-dichloropyrimido[4,5-d]pyridazine and 20 parts of morpholine is heated on a water bath at 80 to 85° C. for 3 hours, followed by distillation under reduced pressure to remove excess morpholine.

To the residue is added 30 volume parts of cold water, and the separated crystals are recrystallized from methyl alcohol to give 2.2 parts of 2-phenyl-5,8-dimorpholinopyrimido[4,5-d]pyridazine as yellow needles melting at higher than 300° C.

*Elementary analysis.*—Calculated for $C_{20}H_{24}N_6O_2$ (percent): C, 63.14; H, 6.36; N, 22.09. Found (percent): C, 63.35; H, 6.34; N, 22.24.

After a similar manner to the above, the following starting materials are produced:

| Compound | Crystal | Melting point (° C.) |
|---|---|---|
| 2-(2-thienyl)-5,8-dimorpholinopyrimido[4,5-d]pyridazine. | Yellow granules. | 200-203 |
| 2-(2-thienyl)-5,8-dipiperidino-pyrimido[4,5-d]pyridazine | do | 158-159 |
| 2-(5-morpholine-2-furyl)-5,8-dimorpholinopyrimido[4,5-d]pyridazine. | Orange-yellow needles. | 222 |
| 2-(4-chlorophenyl)-5,8-dipiperidinopyrimido[4,5-d]pyridazine. | Brown needles. | 180-181 |
| 2-phenyl-5,8-dipiperidinopyrimido[4,5-d]pyridazine. | Yellow-brown plates. | [1]144 |

[1] Decomposed.

EXAMPLE 1

To a solution of 7.56 parts of 2-phenyl-5,8-dimorpholinopyrimido[4,5-d]pyridazine and 500 volume parts of acetic acid is added 0.7 part of platinum oxide. The mixture is allowed to contact under stirring with hydrogen gas at atmospheric pressure and room temperature for 40 hours, during which time 500 volume parts of hydrogen gas is consumed.

After completion of the reaction, the catalyst is filtered off and the filtrate is concentrated under reduced pressure. To the residue is added 100 volume parts of cold water, followed by neutralization with sodium bicarbonate. The separated crystals are recrystallized from methyl alcohol to give 6.7 parts of 2-phenyl-3,4-dihydro-5,8-dimorpholinopyrimido[4,5-d]pyridazine as yellow prisms melting at 246 to 247° C. (decomp.:).

*Elementary analysis.*—Calculated for $C_{20}H_{24}N_6O_2$ (percent): C, 63.14; H, 6.36; N, 22.09. Found (percent): C, 63.35; H, 6.34; N, 22.25.

EXAMPLE 2

To a mixture of 1.0 part of lithium aluminum hydride and 100 volume parts of ethyl ether is added 0.5 part of 2-phenyl-5,8-dimorpholinopyrimido[4,5-d]pyridazine, and the whole mixture is refluxed under stirring for 5 hours.

After completion of the reaction, to the reaction mixture is added at first 2 volume parts of water and then 1 volume part of 6 N aqueous solution of sodium hydroxide under cooling and stirring, followed by filtration to remove the insolubles. The etheric solution is dried over magnesium sulfate and concentrated to dryness. The residue is subjected to silica-gel column-chromatography to give 2-phenyl-3,4-dihydro-5,8-dimorpholinopyrimido-[4,5-d]pyridazine as yellow crystals.

Mixed examination of this product with the compound of Example 1 results in no melting point depression.

EXAMPLE 3

To a solution of 1.0 part of 2-phenyl-5,8-dimorpholinopyrimido[4,5-d]pyridazine and 60 volume parts of methyl alcohol is added 1.0 part of sodium borohydride under cooling and stirring, followed by being left standing for 2 hours. After completion of the reaction, separated crystals are recrystallized from methyl alcohol to give 0.9 part of 2-phenyl-3,4-dihydro-5,8-dimorpholinopyrimido-[4,5-d]pyridazine as yellow prisms.

Mixed examination of this product with the compound of Example 1 results in no melting point depression.

After a similar manner to the above, the following compounds are produced;

| Compound | Crystal | Melting point (° C.) |
|---|---|---|
| 2-(2-thienyl)-3,4-dihydro-5,8-dimorpholino-pyrimido[4,5-d]pyridazine. | Yellow prisms. | [1] 231-233 |
| 2-(2-thienyl)-3,4-dihydro-5,8-dipiperidino-pyrimido[4,5-d]pyridazine. | do | [1] 133-135 |
| 2-(5-morpholino-2-furyl)-3,4-dihydro-5,8-dimorpholinopyrimido[4,5-d]pyridazine, | Yellow fine crystals. | [1] 145-146 |
| 2-phenyl-3,4-dihydro-5,8-bis(cyclohexylamino)pyrimido [4,5-d]pyridazine. | Yellow needles. | 135-140 |
| 2-(4-chlorophenyl)-3,4-dihydro-5,8-dipiperidinopyrimido[4,5-d]pyridazine. | do | [1] 175-185 |
| 2-phenyl-3,4-dihydro-5,8-dipiperidinopyrimido[4,5-d]pyridazine. | do | 118-121 |
| 2-phenyl-3,4-dihydro-5,8-bis(3,5-dimethylmorpholino)pyrimido[4,5-d]pyridazine. | do | 114-119 |
| 2-(m-tolyl)-3,4-dihydro-5,8-bis(isopropylamino)pyrimido[4,5-d]-pyridazine. | do | 104-109 |
| 2-phenyl-3,4-dihydro-5,8-dianilino-pyrimido[4,5-d]pyridazine. | Orange needles. | 133-137 |
| 2-phenyl-3,4-dihydro-5,8-bis(benzylamino)pyrimido[4,5-d]pyridazine. | Yellow needles. | 104-105 |

[1] Decomposed.

EXAMPLE 4

To a solution of 1.0 part of 2-phenyl-5,8-dimorpholinopyrimido[4,5-d]pyridazine and 200 volume parts of ethyl alcohol is added 5.0 parts of metalic sodium under stirring, followed by refluxing for 10 hours. After completion of the reaction, the reaction mixture is concentrated to dryness under reduced pressure. The residue is subjected to silica-gel column-chromatography to give 0.4 part of 2 - phenyl - 3,4-dihydro-5,8-dimorpholinopyrimido[4,5-d]
pyridazine as yellow crystals.

Mixed examination of this product with the compound of Example 1 results in no melting point depression.

EXAMPLE 5

To a 50 volume parts of 10 weight percent hydrochloric acid is added 10.0 parts of 2-phenyl-3,4-dihydro-5,8-dimorpholinopyrimido[4,5-d]pyridazine under heating at 50° C., followed by keeping standing under ice cooling overnight. This procedure gives 8.9 parts of 2-phenyl-3,4-dihydro-5,8-dimorpholinopyrimido[4,5-d]pyridazine hydrochloride as yellow hairy crystals melting at 220° to 235° C. (decomposition).

*Elementary analysis.*—Calculated for $C_{20}H_{25}N_6O_2Cl \cdot 2H_2O$ (percent): C, 53.03; H, 6.45; N, 18.55; Cl, 7.83. Found (percent): C, 53.10; H, 6.36; N, 18.58; Cl, 7.78.

EXAMPLE 6

To a solution of 1.0 part of 2-phenyl-3,4-dihydro-5,8-dimorpholinopyrimido[4,5-d]pyridazine hydrochloride in 400 volume parts of water is added a 1 weight percent aqueous solution of sodium hydroxide until the pH value of the system becomes about 8 to about 10, whereby 0.76 part of 2-phenyl-1,4-dihydro-5,8-dimorpholinopyrimido-[4,5-d]pyridazine is obtained as pale yellow fine granules melting at 145° to 150° C.

*Elementary analysis.*— Calculated for $C_{20}H_{24}N_6O_2$ (percent): C, 63.14; H, 6.36; N, 22.09. Found (percent): C, 63.27; H, 6.28; N, 22.15

What we claim is:

1. A compound selected from the group consisting of the formula

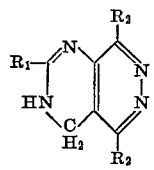

wherein $R_1$ is a member selected from the group consisting of phenyl, naphthyl and said groups substituted by alkyl of 1-3 carbon atoms, halogen, morpholino, piperazine or pyrrolidino, and $R_2$ represents pyrrolidino, piperidino, morpholino, methylmorpholino, dimethylmorpholino, piperazino, N-methyl-piperazino, N-benzylpiperazino, mono- or di-alkyl amino having 1-6 carbon atoms in each alkyl group, cyclopentylamino, cyclohexylamino, anilino, naphthylamino, benzylamino, phenylethylamino, N-methyl-2-hydroxyethylamino or N-benzyl-2-hydroxyethylamino, 1,4-dihydro isomers thereof and pharmaceutically acceptable salts thereof.

2. A compound as claimed in claim 1, wherein $R_2$ is a cyclic amino group.

3. A compound as claimed in claim 1 wherein $R_2$ is a monoarylamino group.

4. A compound as claimed in claim 1 wherein $R_2$ is a monoaralkylamino group.

5. A compound as claimed in claim 1, wherein $R_2$ is selected from the group consisting of monoalkylamino, dialkylamino and monocycloalkylamino.

6. A compound as claimed in claim 1, wherein the compound is 2-phenyl-3,4-dihydro - 5,8 - dimorpholinopyrimido[4,5-d]pyridazine.

7. A compound as claimed in claim 1, wherein the compound is 2-(4-chlorophenyl) - 3,4 - dihydro-5,8-dipiperidinopyrimido[4,5-d]pyridazine.

8. A compound as claimed in claim 1, wherein the compound is 2-phenyl - 3,4 - dihydro-5,8-dipiperidinopyrimido[4,5-d]pyridazine.

9. A compound as claimed in claim 1, wherein the compound is 2-phenyl-3,4-dihydro-5,8-bis(3,5-dimethylmorpholino)pyrimido[4,5-d]pyridazine.

10. A compound as claimed in claim 1, wherein the compound is 2-(m-tolyl)-3,4-dihydro-5,8-bis(isopropylamino)pyrimido[4,5-d]pyridazine.

11. A compound as claimed in claim 1, wherein the compound is 2-phenyl-3,4-dihydro-5,8-dianilinopyrimido-[4,5-d]pyridazine.

12. A compound as claimed in claim 1, wherein the compound is 2-phenyl-3,4-dihydro-5,8-bis(benzylamino)pyrimido[4,5-d]pyridazine.

13. A compound as claimed in claim 1, wherein the compound is 2-phenyl-3,4-dihydro-5,8-bis(cyclohexylamino)pyrimido[4,5-d]pyridazine.

14. A compound as claimed in claim 1, wherein the compound is 2-phenyl - 3,4 - dihydro-5,8-dimorpholinopyrimido[4,5-d]pyridazine hydrochloride.

No references cited.

ALEX MAZEL, Primary Examiner

J. TOVAR, Assistant Examiner

U.S. Cl. X.R.

260—256.4 F; 424—248